US012810261B2

(12) United States Patent
Jin et al.

(10) Patent No.: US 12,810,261 B2
(45) Date of Patent: Nov. 24, 2026

(54) BLOCKCHAIN TRANSACTION SHARDING FOR IMPROVED TRANSACTION THROUGHPUT

(71) Applicant: HSBC SOFTWARE DEVELOPMENT (GUANGDONG) LIMITED, Guangzhou (CN)

(72) Inventors: Siyuan Jin, Guangzhou (CN); Yong Xia, Guangzhou (CN)

(73) Assignee: HSBC SOFTWARE DEVELOPMENT (GUANGDONG) LIMITED, Guangzhou (CN)

( * ) Notice: Subject to any disclaimer, the term of this patent is extended or adjusted under 35 U.S.C. 154(b) by 0 days.

(21) Appl. No.: 18/880,545

(22) PCT Filed: Aug. 16, 2022

(86) PCT No.: PCT/CN2022/112811

§ 371 (c)(1),
(2) Date: Dec. 31, 2024

(87) PCT Pub. No.: WO2024/011707

PCT Pub. Date: Jan. 18, 2024

(65) Prior Publication Data

US 2026/0004262 A1 Jan. 1, 2026

(30) Foreign Application Priority Data

Jul. 11, 2022 (CN) ........................ 202210814988.X

(51) Int. Cl.
*G06Q 20/06* (2012.01)
*G06Q 20/38* (2012.01)

(52) U.S. Cl.
CPC ......... *G06Q 20/065* (2013.01); *G06Q 20/389* (2013.01); *G06Q 2220/00* (2013.01)

(58) Field of Classification Search
None
See application file for complete search history.

(56) References Cited

U.S. PATENT DOCUMENTS 10,346,217 B1 * 7/2019 Bray ..................... G06F 9/5033
10,740,733 B2 * 8/2020 Moir ..................... H04L 9/3247
(Continued)

FOREIGN PATENT DOCUMENTS

CN 109544334 3/2019
CN 111127017 A * 5/2020 ............... H04L 9/50
(Continued)

OTHER PUBLICATIONS

Loïc Lesavre et al. "Blockchain Networks: Token Design and Management Overview." (Feb. 2021). Retrieved online Jan. 20, 2026. https://nvlpubs.nist.gov/nistpubs/ir/2021/NIST.IR.8301.pdf (Year: 2021).*

(Continued)

*Primary Examiner* — James A Reagan
(74) *Attorney, Agent, or Firm* — Dentons Durham Jones Pinegar P.C.

(57) ABSTRACT

A method of performing a blockchain transaction in a transaction network comprising a plurality of transaction network shards is disclosed, where each shard maintains a respective blockchain for recording blockchain transactions. A transaction request for transferring asset value represented by one or more tokens is received and an input token for use in the transaction is determined. The method then identifies a given one of the plurality of shards associated with the input token and forwards transaction information for the transaction to a shard controller associated with the identified shard to initiate performance of the transaction by the shard controller. The method may, for example, find application in cryptocurrency networks.

20 Claims, 8 Drawing Sheets

(56) References Cited

U.S. PATENT DOCUMENTS

| | | | | |
|---|---|---|---|---|
| 11,620,152 | B2 * | 4/2023 | Huang | G06F 16/2379 718/101 |
| 11,687,562 | B2 * | 6/2023 | Chung | G06F 16/27 707/609 |
| 11,803,844 | B2 * | 10/2023 | Le Van Gong | H04L 9/085 |
| 11,989,208 | B2 * | 5/2024 | Douglass | G06F 16/278 |
| 12,028,453 | B2 * | 7/2024 | Kramer | G06F 21/64 |
| 12,200,054 | B2 * | 1/2025 | Cao | G06F 16/27 |
| 12,243,057 | B2 * | 3/2025 | Martin | G06F 21/6209 |
| 2018/0341930 | A1 * | 11/2018 | Moir | H04L 9/3239 |
| 2019/0036887 | A1 * | 1/2019 | Miller | G07C 9/20 |
| 2020/0026548 | A1 * | 1/2020 | Huang | G06F 16/2379 |
| 2020/0042635 | A1 * | 2/2020 | Douglass | G06F 16/278 |
| 2020/0160320 | A1 * | 5/2020 | Williams | H04L 9/0637 |
| 2020/0294006 | A1 * | 9/2020 | Hadi | G06Q 20/065 |
| 2021/0203477 | A1 * | 7/2021 | Zhu | H04L 9/0618 |
| 2021/0234665 | A1 * | 7/2021 | Kramer | G06F 16/2379 |
| 2021/0273807 | A1 * | 9/2021 | Wertheim | G06F 9/466 |
| 2021/0319436 | A1 * | 10/2021 | Ow | G06Q 20/0658 |
| 2021/0406872 | A1 * | 12/2021 | Thai | H04L 9/50 |
| 2022/0027348 | A1 * | 1/2022 | Manevich | G06F 16/2379 |
| 2022/0043831 | A1 * | 2/2022 | Douglass | G06F 16/278 |
| 2022/0118365 | A1 * | 4/2022 | Thacker | A63F 13/71 |
| 2022/0393881 | A1 * | 12/2022 | Ow | G06Q 20/3678 |
| 2023/0177496 | A1 * | 6/2023 | Le Van Gong | G06Q 20/065 |
| 2023/0308276 | A1 * | 9/2023 | Bathen | H04L 9/3236 |
| 2024/0249289 | A1 * | 7/2024 | Chiapuzio | G06Q 20/065 |
| 2024/0313970 | A1 * | 9/2024 | Mahalingaiah | G06Q 30/0208 |
| 2024/0414228 | A1 * | 12/2024 | Cao | G06F 16/27 |
| 2025/0190966 | A1 * | 6/2025 | Gutierrez-Sheris | G06Q 20/20 |
| 2025/0293883 | A1 * | 9/2025 | Gilchrist | H04L 9/50 |
| 2026/0010898 | A1 * | 1/2026 | Le Van Gong | G06Q 20/3825 |

FOREIGN PATENT DOCUMENTS

| | | | | |
|---|---|---|---|---|
| CN | 112041872 | | 12/2020 | |
| WO | WO-2019207501 | A1 * | 10/2019 | G06Q 20/3827 |
| WO | WO-2020033216 | A2 * | 2/2020 | G06F 9/4881 |

OTHER PUBLICATIONS

Mahdi Zamani et al. "RapidChain: Scaling Blockchain via Full Sharding." (2018). Retrieved online Jan. 20, 2026. https://eprint.iacr.org/2018/460.pdf (Year: 2018).*

Loi Luu et al. "A Secure Sharding Protocol For Open Blockchains." (2016). Retrieved online Jan. 20, 2026. https://people.cs.georgetown.edu/~cnewport/teaching/cosc841-spring19/papers/new/sharding.pdf (Year: 2016).*

International Search Report issued in corresponding PCT Application No. PCT/CN2022/112811, dated Apr. 6, 2023.

* cited by examiner

| OUTPUT_INDEX | TRANSACTION_ID | CONSUMED_TIMESTAMP | NOTARY_NAME | RECORDED_TIMESTAMP |
|---|---|---|---|---|
| 0 | 67C8E2D94542A60273D3612222008D804F16B7DF0058D986F5063481ADC1962 | 2022-06-21 09:30:17.761 | O=Notary1, L=Guangzhou, C=CN | 2022-06-21 09:29:38.008 |
| 1 | 88E0E7285C68E98D6ABEC6DC790A695EC362AC9FDEB105A3EA2167625369BC5 | null | O=Notary1, L=Guangzhou, C=CN | 2022-06-21 09:30:17.761 |

BLOCKCHAIN TRANSACTION SHARDING FOR IMPROVED TRANSACTION THROUGHPUT

CROSS-REFERENCE TO RELATED APPLICATION

This application is a national phase application under 35 U.S.C. § 371 of International Application No. PCT/CN2022/112811, filed Aug. 16, 2022, which claims priority to and the benefit of Chinese Application No. 202210814988.X, filed Jul. 11, 2022. The contents of the referenced patent applications are incorporated into the present application by reference.

FIELD OF THE INVENTION

The technology relates to the general field of blockchain sharding and has certain specific applications to cryptocurrency systems.

BACKGROUND OF THE INVENTION

Blockchain-based token transaction systems, such as cryptocurrency systems, often suffer from performance problems due to comparatively low transaction throughput compared to more centralised transaction systems. Certain inherent design characteristics of blockchains lead to increased transaction processing times, such as the coordination required in a blockchain network (e.g. to implement consensus algorithms), and the need to accumulate transactions sequentially into blocks for addition to the blockchain. Past attempts to address this have involved dividing blockchain systems into subsystems or subnetworks (also referred to as shards) on a user account basis, such that different user accounts are held in different shards and hence different blockchains (user-based sharding). However, this necessitates cross-shard transactions where tokens must be "moved" across blockchains, (for example if a user in one shard transfers a token to a user in another shard), which are computationally expensive and significantly increase transaction latency.

Embodiments of the invention accordingly seek to address certain throughput and/or latency limitations of existing approaches.

SUMMARY OF THE INVENTION

In a first aspect, the invention provides a method of performing a blockchain transaction in a transaction network comprising a plurality of transaction network shards, each shard maintaining a respective blockchain for recording blockchain transactions, the method comprising:

- receiving a transaction request for transferring asset value represented by one or more tokens,
- determining an input token for use in the transaction;
- identifying a given one of the plurality of shards associated with the input token; and
- forwarding transaction information for the transaction to a shard controller associated with the identified shard to initiate performance of the transaction by the shard controller.

By sharding blockchain transactions based on token (rather than e.g. user), the need for cross-shard transactions can be greatly reduced, since tokens (and the asset/value they represent) remain in one network shard regardless of transaction history (e.g., being transferred between different users possibly multiple times).

Tokens may, for example, represent cryptocurrency values or values of other divisible assets (e.g. represented as numerical amounts of the cryptocurrency or asset). Other examples of such assets could include reward points, carbon credits, resource allocations (e.g. processing credits in a cloud server farm) etc. Tokens may alternatively or additionally represent singular, indivisible (possibly unique) assets, e.g. as non-fungible tokens (e.g. concert tickets, digital media assets etc.) The term "asset" or "asset value" may be used interchangeably to refer to any entity or asset represented by tokens, whether divisible or able to be represented numerically as asset (value) quantities or not.

It should thus be noted that tokens may represent any entity, concept or asset, and it is not of fundamental importance what the tokens represent, since the invention is concerned with improving the efficiency, throughput and/or latency of token transactions in a transaction network, irrespective of the purpose served by the tokens. However, cryptocurrencies are used as a particular example throughout, since cryptocurrency systems tend to involve large transaction volumes, and thus provide an application context in which the technical improvements of the disclosed techniques may become particularly useful.

Preferably, the identifying step comprises accessing a data structure providing a mapping between tokens and the shards hosting the tokens. The data structure may comprise a token map which maps, for each of a plurality of tokens, identifying information of the token to shard information that identifies the shard hosting the token. The term "hosting" here preferably means that the shard is responsible for processing/recording transactions involving the token and/or that the token is stored in the local blockchain of the shard. Thus, different tokens in the token transaction system may be hosted on different shards.

Preferably, the token map identifies for each token, a corresponding shard identifier of the shard hosting the token and/or an identifier of a shard controller for that shard. Thus, the shard may be directly identified by way of a shard identifier, or the map may specify the shard controller corresponding to the shard. More generally, the shard identifying information in the map may identify a shard in any suitable way, whether by reference to the shard, a representative network node of the shard, a network (e.g. IP address) of such a node (e.g. a shard controller address) etc.

The identifying step preferably comprises looking up the shard information for the input token in the data structure or token map based on identifying information of the token. The data structure may comprise a table, optionally a hash table/hash map (e.g. using the token identifying information as the key which is hashed to retrieve the corresponding shard identifier).

Tokens may be identified by any suitable form of token identifying information. The step of determining the input token may involve obtaining identifying information of the token. Token identifying information for a given token may comprise a transaction identifier of a transaction that generated the token and may further comprise an output index identifying a particular output token of that transaction. An output index preferably identifies a specific one of a set of one or more transaction outputs of the transaction referenced by the transaction identifier. Tokens in the system may comprise Unspent Transaction Outputs (UTXO), and thus the output index may identify a particular UTXO of the transaction referenced by the transaction ID.

The method may be performed at a service provider processing device.

The term "shard" as used herein preferably refers to a subdivision of a network or system, e.g. a subsystem/subnetwork of the transaction processing system/network, where different shards preferably handle different transactions and/or host different subsets of the tokens that are in circulation in the transaction network.

The shard controller associated with the identified shard is preferably a given one of a plurality of shard controllers associated with respective ones of the shards which is configured for controlling and/or recording transactions involving the input token. In other words, the shard controller is preferably a controller for the shard hosting the input token. Shard controllers are also referred to as network leaders (for the subnetwork corresponding to the shard).

Preferably, each shard is arranged to maintain a respective blockchain for recording transactions. Each blockchain may be a permissioned/private blockchain. Thus, read and/or write access to the blockchains may require permissions (e.g. verified by suitable user credentials); privacy may be provided by encryption of blockchain content.

Each shard preferably comprises a subnetwork of the transaction network, optionally comprising a private network (e.g. requiring permissions for access to and/or participation in the network). Each shard may comprise one or more network nodes of a blockchain network for the blockchain maintained by the shard, the network nodes preferably including the shard controller for the shard. Thus, each shard controller may be a blockchain node (specifically a leader node) of its respective blockchain network.

Preferably, the transaction network is arranged for processing transactions involving a plurality of tokens, and wherein each network shard and/or blockchain is arranged to process and/or record transactions for a respective (distinct) subset of the plurality of tokens. Each token is thus preferably stored in a respective one of the blockchains and/or associated with a particular one of the plurality of shards.

The method preferably comprises, at the shard controller, processing the transaction involving the input token, where the processing may comprise recording the transaction in a blockchain associated with the shard controller (e.g. the blockchain of that shard). The method may comprise initiating by the shard controller a consensus process involving one or more other nodes of its shard (i.e. of its blockchain network) prior to recording the transaction.

Preferably, the transaction consumes the input token and generates one or more output tokens, the one or more output tokens associated with the same shard as the input token (and hence preferably stored in the same shard blockchain). The shard controller is preferably configured to record a blockchain transaction in its blockchain mapping the input token to the one or more output tokens. The output tokens may thus correspond to unspent transaction outputs (UTXOs) of the transaction that consumed the input token.

Preferably, the method comprises sending by the shard controller a response to the service provider processing device, the response identifying one or more output tokens of the transaction (e.g. by including token identifying information).

The method may comprise, at the service provider processing device, receiving a response identifying one or more output tokens of the transaction, and updating the token map to include entries identifying the output tokens and associated shard (in which the output tokens are hosted). The method may further comprise removing or invalidating one or more input tokens to the transaction from the token map.

In an embodiment, the token map may specify a consumption timestamp indicating a consumption time of a token, the method comprising at least one of: setting a consumption time of an invalidated input token to a time value, for example a current or transaction time; and setting a consumption time of an output token newly generated by a transaction to a null value.

Determining the input token may comprise selecting one of a plurality of tokens associated with a user submitting the transaction request. The method may include storing a database of token information identifying tokens associated with users, optionally comprising a user wallet, the method comprising selecting the input token for the transaction associated with the submitting user based on a transaction value of the transaction, optionally by selecting one or more tokens having a value or combined value meeting or exceeding the transaction value. Alternatively, the user could specify the token(s) to use in the transaction request.

The method may further comprise performing a cross-shard transaction to consolidate a first token in a first shard and a second token in a second shard into a third token, the third token preferably having a value corresponding to the sum of values of the first and second tokens, wherein the third token is preferably hosted in one of the first and second shards. The first and second tokens are preferably invalidated/destroyed as a result of the consolidation. The cross-shard transaction may be performed in response to a transaction request requiring use of tokens from different shards as inputs to a transaction. Alternatively, the cross-shard transaction or a plurality of such transactions may be performed to consolidate tokens from different shards periodically and/or during a predetermined time period (e.g. independently of any transactions). The predetermined time period may be a time period associated with a (relatively) low transaction load in the transaction network (e.g. compared to one or more other periods with higher transaction loads).

In a further aspect of the invention (which may be combined with the above aspect), there is provided a transaction system comprising a network of nodes for processing transactions for transfer of assets represented by tokens between users of the transaction system, wherein the transaction system comprises:

- a plurality of shards, each shard comprising:
  - a blockchain network adapted to maintain a set of transactions for the shard in a blockchain, and
  - at least one shard controller configured to control recording of transactions in the blockchain of the shard;
  - wherein each shard manages a respective set of tokens stored in the respective blockchain of the shard, the shard controller for a shard adapted to control transaction processing for tokens managed by the shard;
- a service provider node configured to perform transactions for transfer of assets represented by tokens, the service provider node configured to:
- receive a request to process a transaction involving a token;
- identify one of the shards hosting the token, wherein the token is stored in the blockchain of the identified shard; and
- transmit transaction information for the transaction to the shard controller of the identified shard;
- and wherein the shard controller is configured to record a transaction relating to the token in its blockchain based on the transaction information.

Preferably, the blockchains maintained by respective shards are private or permissioned blockchains. Each shard may comprise a subnetwork of the transaction system, optionally comprising a private network. Each shard may comprise one or more blockchain nodes of the blockchain network for the blockchain maintained by the shard, the blockchain nodes preferably including the shard controller for the shard.

The transaction system is preferably arranged for processing transactions involving a plurality of tokens, and wherein each shard and/or blockchain is arranged to process and/or record transactions for a respective subset of the plurality of tokens; wherein each token is preferably stored in a respective one of the blockchains and/or associated with a particular one of the plurality of shards. Each shard may comprise one or more further nodes configured to participate in a consensus process for recording transactions in the shard's blockchain.

The system according to this aspect is preferably configured to perform or participate in, or provide the further steps or features of, any method as set above or as described below.

The invention further provides a processing device having means, optionally comprising a processor with associated memory, configured to perform any method as set out herein.

The invention further provides or more one or more computer program(s), computer program product(s) or non-transitory computer readable media comprising software code adapted, when executed on one or more processing devices, to perform any method as set out herein.

Any feature in one aspect of the invention may be applied to other aspects of the invention, in any appropriate combination. In particular, method aspects may be applied to apparatus/system and computer program aspects, and vice versa.

Furthermore, features implemented in hardware may generally be implemented in software, and vice versa. Any reference to software and hardware features herein should be construed accordingly.

BRIEF DESCRIPTION OF THE FIGURES

Preferred features of the present invention will now be described, purely by way of example, with reference to the accompanying drawings, in which.

DETAILED DESCRIPTION

Figure 1:
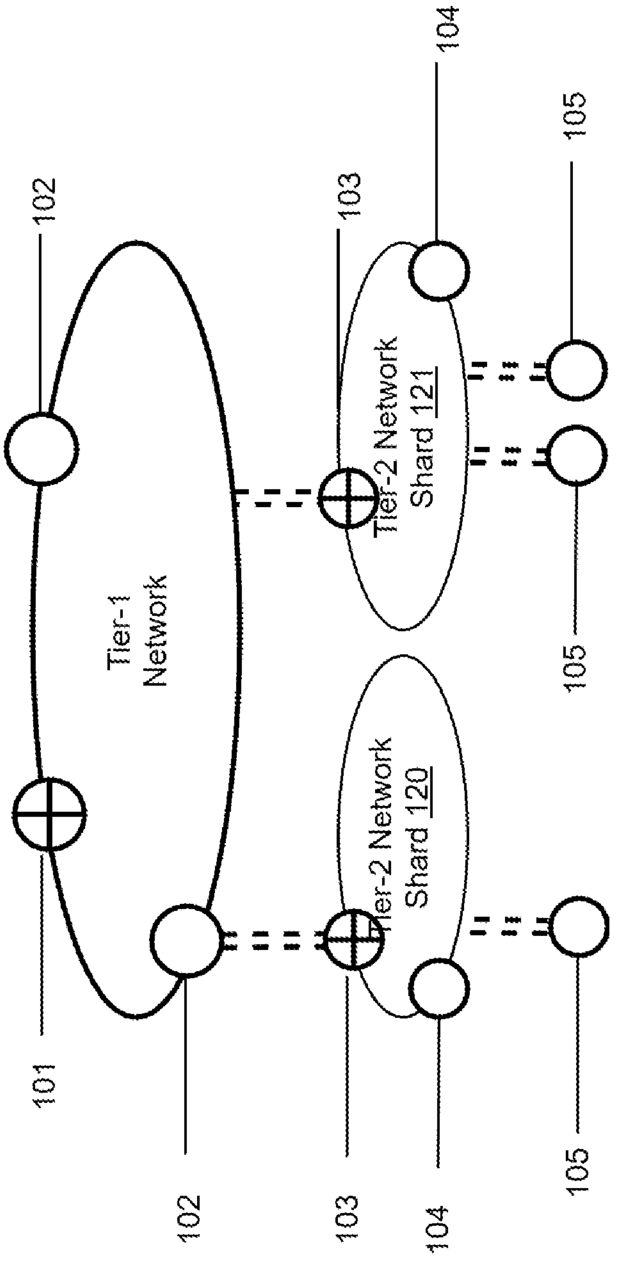
FIG. 1 illustrates a stablecoin hybrid network involving multiple shards.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalents.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The disclosed technology is generally related to sharding for blockchain transactions. The described system provides a UTXO-based sharding method to achieve horizontal scalability in token-based blockchain transaction systems, including cryptocurrency systems. A technical problem of the use of sharding is that the introduction of extra cross-shard transactions significantly impacts transaction latency. Previous solutions use account-based sharding to improve transaction volume, but this also increases latency.

The proposed method can improve transaction throughput linearly while keeping latency low by reducing cross-shard transactions.

Most cryptocurrencies have associations with blockchain techniques. Blockchain includes permissionless blockchain and permissioned blockchain: permissionless blockchain is accessible to the public, while permissioned blockchain serves registered members. For example, a stablecoin network is permissioned by regulators and participants.

The following embodiments assume blockchain-based transaction networks in which tokens are transferred between users in transactions. The tokens are in the form of UTXO, Unspent Transaction Output, tokens (as used e.g. in Bitcoin). UTXOs are spendable tokens in a blockchain system, in which the token is a reference to a specific output of a specific transaction. Thus, rather than existing as independent structures, UTXO tokens are simply references to transaction outputs, which play the role of value tokens in the system. A transaction consumes one or more input UTXO tokens and generates one or more new tokens as its outputs.

In described approaches, tokens may be associated with values (typically numerical values) indicating a currency or asset quantity represented by the token/UTXO. A transaction may consume an input token and replace it with one or more output tokens of different currency/asset quantities which sum to the input token quantity, assigned to the same and/or different users as token owners.

Example embodiments were implemented using blockchains based on Corda blockchain technology. However, the described methods can be used with any suitable type of blockchain or distributed ledger technology (for example Hyperledger Fabric), and with any suitable token representation. Thus, other forms of distributed ledger may be substituted for blockchains.

Where tokens are value tokens in a cryptocurrency system, tokens may also be referred to as "coins". However, described techniques may also be used with other types of tokens, such as non-fungible tokens (e.g. tokens representing individual, non-divisible assets). Example embodiments are further described in relation to regulated cryptocurrency networks, especially networks for cryptocurrencies (cryptocurrencies whose value is tied to that of another currency, commodity or financial instrument). However, the described approaches are applicable to any type of cryptocurrency, as well as other token transaction systems not related to cryptocurrencies.

FIG. 1 illustrates an overview of a regulated cryptocurrency network. A regulated cryptocurrency can operate in a tiered model where tier-0 institutions issue and redeem their regulated cryptocurrencies. Tier-0 institutions usually are central banks or national regulators. In some regulated stablecoin projects, tier-0 institutions allow tier-1 institutions to issue and redeem their stablecoin directly. Furthermore, tier-1 institutions can distribute and circulate tier-0's stablecoin.

In more detail, FIG. 1 shows a stablecoin hybrid network consisting of a tier-1 network and multiple tier-2 networks. The tier-1 network and tier-2 networks are each private blockchain networks. The tier-1 private network leader 101 is the stablecoin issuer. The tier-2 network leaders 103 are the stablecoin service providers. Both tier-1 and tier-2 network validators 102 and 104 work to verify the leaders' operations. Public customers 105 can use stablecoin by accessing any tier-2 network.

In FIG. 1, the Tier-1 network consists of tier-0 and tier-1 institutions. Tier-1 network leader 101 is operated by tier-0 institutions which can issue and redeem coins. Tier-1 network validators 102 can be third-party validators or tier-2 institutions to verify leader 101's operations. Tier-2 network consists of tier-1 and tier-2 institutions. The figure shows two tier-2 networks 120 and 121. Each constitutes a "shard" of the overall transaction system. Tier-2 network leaders 103 are operated by tier-1 institutions which can provide services to the public and corporate users 105.

Each shard is a separate private network which maintains a separate blockchain. In preferred embodiments, these are private (permissioned) blockchains. Public users 105 typically cannot become nodes in a permissioned blockchain because each participant needs to deploy a server with a fixed IP address to execute business logic. In addition, participating in the network requires the network's approval which consumes much time. However, users can access cryptocurrency services by connecting with tier-2 network servers 104.

Unlike existing solutions, shards are divided not by user/user accounts, but by tokens. Thus, each shard (maintaining its own separate blockchain) is responsible for a respective subset of the tokens that exist in the system, with a particular token allocated to a particular shard. In the present case the tokens are UTXO tokens and so this is referred to as UTXO-based sharding.

Figure 2:
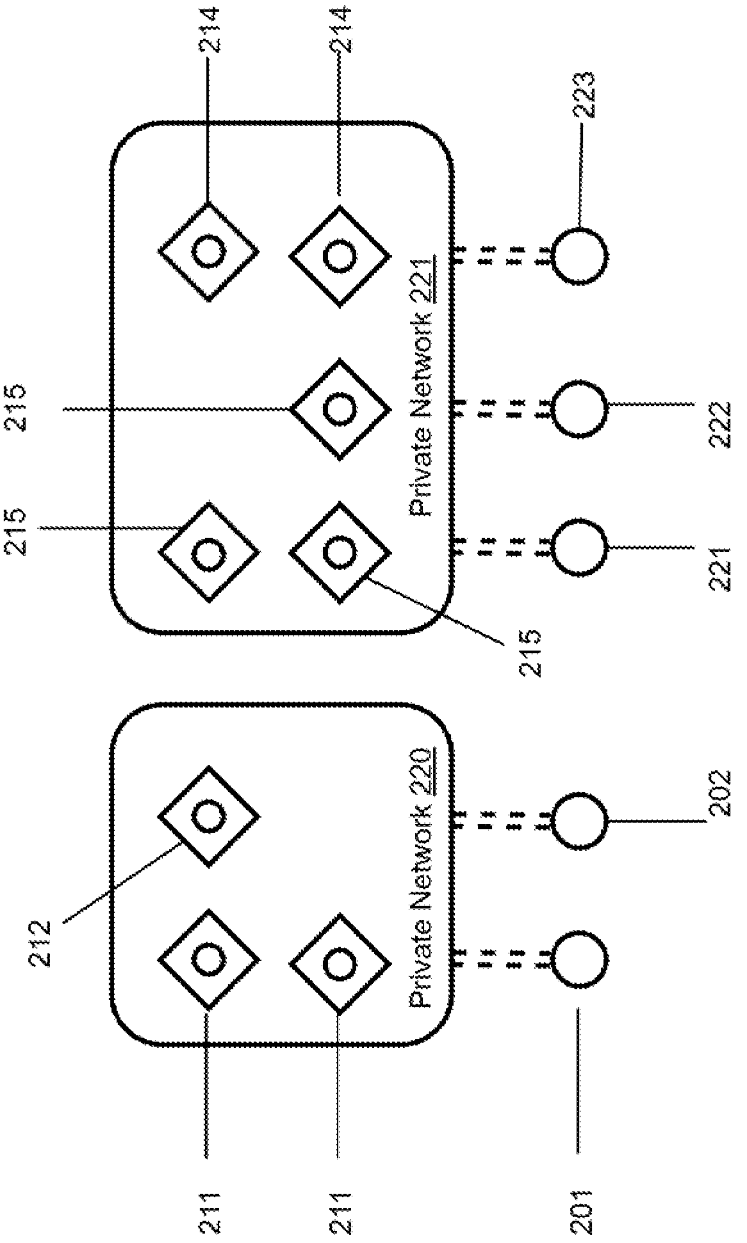
FIG. 2 illustrates a general UTXO-based sharding structure.

UXTO-based sharding is illustrated in FIG. 2. Sharding divides transaction requests to different private networks. Different users can connect to different private networks. In the figure, user 201 and 202 connect to private network 220; users 221, 222, and 223 connect to private network 221.

Each private network (or shard) keeps its tokens in its local database, i.e. in its local private blockchain. In the figure, tokens 211, 212, 214, and 215 belong, respectively, to users 201, 202, 221, and 222. Each token is associated with a particular shard and stored in the blockchain for that shard. Thus, if an available token is recorded in one shard, that same token cannot also appear in another shard. This is also referred to herein as a shard "hosting" a token, indicating that the token is recorded in the shard's blockchain and that the network leader (shard controller) for the shard is responsible for processing transactions involving the token.

While FIG. 2 shows different users connected to different shards hosting their respective tokens this need not always be the case. For example, a particular user may hold tokens in different shards. In typical embodiments, a user may interact with a service provider to use cryptocurrency services, and a particular service provider may interact with different shards to handle tokens stored in those shards.

Figure 3A:
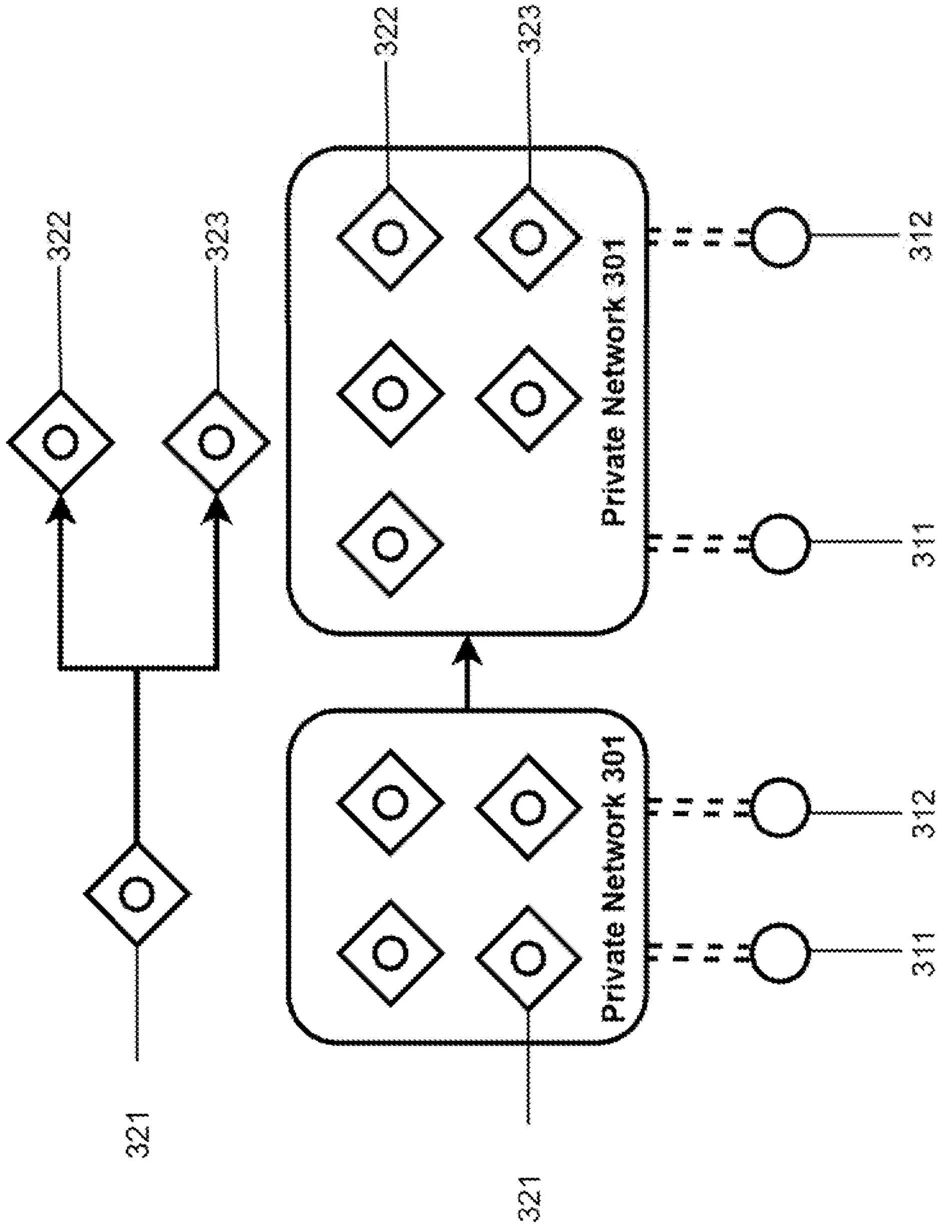
FIG. 3A illustrates an example transaction flow according to the UTXO-based sharding method.

FIG. 3A depicts a transaction inside one private network 301. In the depicted transaction, user 311 pays one stablecoin (UTXO) to user 312. The transaction consumes the token 321 and produces a new token 323 assigned to user 312 and a change token 322 assigned back to user 311. Both tokens are still held inside the private network 301.

A public customer 311 sends a request to a tier-2 private network in a transaction. The request is successful only after it is recorded in the tier-2 private network 301's ledger (blockchain). Users 311 and 312 are represented as a "wallet" type data structure in the network 301, and every user can have multiple wallets on different networks (shards). The private network stores wallet information, with a wallet corresponding to a particular user and recording tokens held by that user in that network (e.g. by recording token identifiers for the user's tokens) and hence in that particular shard. All transactions involving those tokens are recorded in the blockchain for that shard.

Figure 3B:
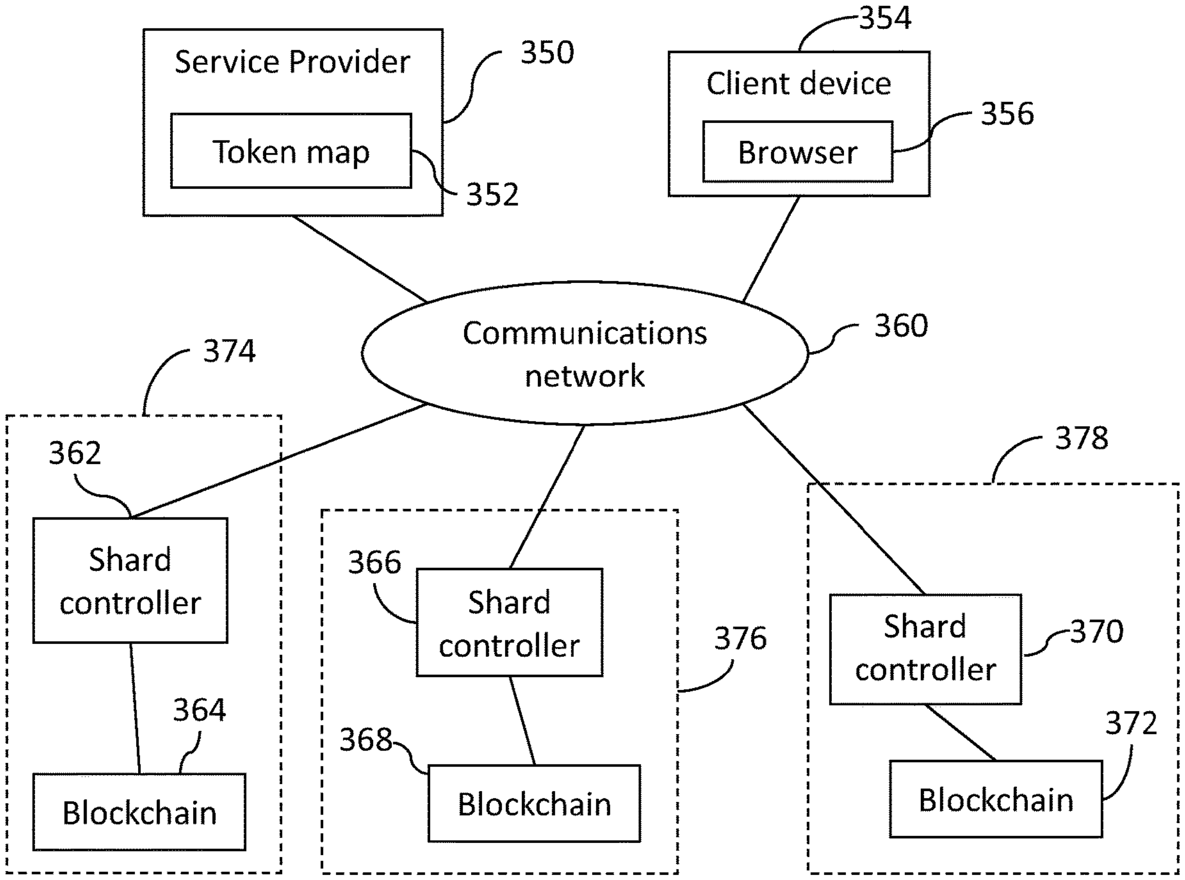
FIG. 3B illustrates a system architecture of a blockchain system implementing UTXO-based sharding.

FIG. 3B illustrates a system architecture of a blockchain system implementing UTXO-based sharding. In the depicted system, a representative client device 354 (e.g. a personal computer, tablet/laptop computer, smartphone or the like) interacts with a service provider system (e.g. one or more servers) 350 to carry out cryptocurrency transactions. The user may, for example, access a cryptocurrency services web application provided by the service provider using a browser 356 on the client device.

The service provider maintains a token map data structure 352 (e.g. as a table, hash map or similar) which stores token identifiers for the service provider's users, and maps each token to the shard responsible for the token, for example by specifying a shard identifier.

Each shard is represented by a shard controller 362, 366, 370, which controls addition of transactions for the shard's tokens to a respective blockchain 364, 368 and 372. The shard controllers fulfil the role of the network leaders for the respective private networks as described above (e.g. network leaders 103 in FIG. 1) and act as blockchain nodes within their respective blockchains. Each shard controller and associated blockchain corresponds to particular shard/private network 374, 376, 378 as described previously. The shards/networks may include additional nodes not shown in FIG. 3B, including additional blockchain nodes in their respective blockchain networks and/or other nodes. Additional nodes could, for example, include verifying nodes, redundant controller nodes or secondary controller nodes (e.g. multiple controller nodes could be provided for failover or load balancing purposes). Note a single client device and a single service provider are shown for representative purposes but in practices any number of these components may participate in the system. Furthermore, three shards are shown by way of example but the system may support any number of shards.

Service provider(s), client device(s) and shard controllers communicate via one or more communications include networks 360, which may any form of computer/communications networks, including wired and/or wireless networks, local and/or wide area networks, as well as private networks and/or public networks (e.g. including the Internet).

In an embodiment, the individual blockchains 364, 368, 372 are Corda-based blockchains. However, any suitable blockchain technology may be substituted. Furthermore, while it may be preferable for each blockchain to be based on the same underlying blockchain technology this may not always be essential, as long as each blockchain is able to process and record equivalent transactions, under control of its shard controller (and other nodes e.g. verifying nodes, as needed). Since the blockchains for each shard are independent, the shard operator is able to design new features to meet their user's needs or requirements of the blockchain stakeholders (network leader/network validators), independently of other shards.

Referring to FIG. 1, the Tier-1 network may itself include a blockchain system based on the same technology as the shard blockchains (e.g. Corda). However, the tier-1 network could also use a different blockchain technology to record tier-1 level transactions (e.g. transactions to mint and transfer digital currency such as stablecoins to the Tier-2 networks).

Figure 4A:
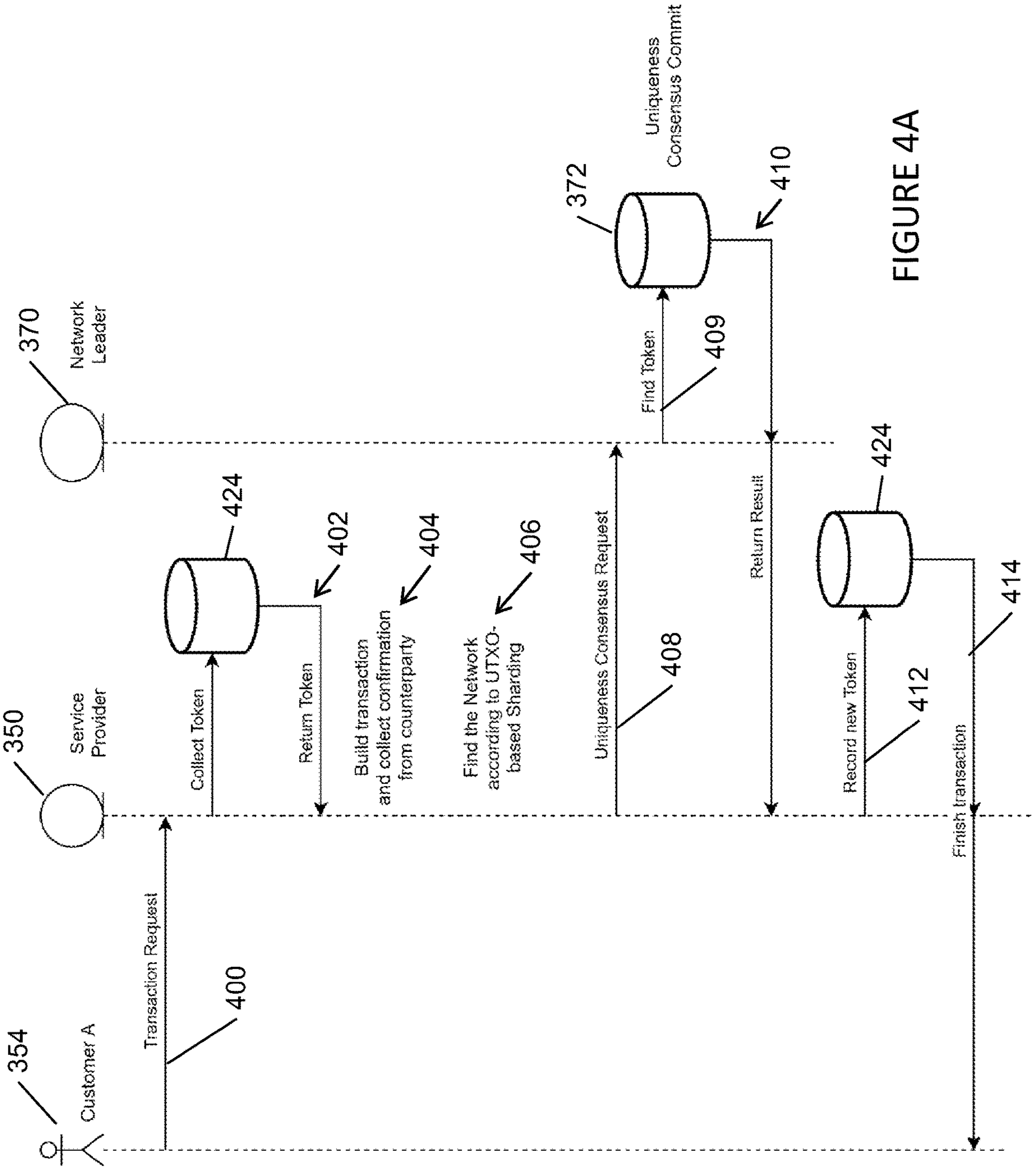
FIG. 4A is a process diagram illustrating processing of a transaction in the system.

FIG. 4A illustrates the process flow for processing transactions using UTXO-based sharding.

In step 400, a user "Customer A" using client device 354 sends a transaction request to the user's service provider 350. For example, the transaction request is a request to transfer a certain value of cryptocurrency to another user. The service provider is a computer system providing cryptocurrency transaction services, and includes a local database 424 which stores user information, including token identifiers of any tokens owned by the service provider's users that are available for use in transactions. The service provider may, for example, implement a digital wallet function to store a user's tokens. A user's tokens can be hosted in any of the shards and a user may hold tokens in multiple shards simultaneously. The local database may synchronize transaction information from shard controllers.

In step 402, the service provider finds available tokens that belong to customer A from the local database 424. Specifically, the service provider identifies as input token(s) for the transaction one or more tokens (by obtaining the token identifier(s) of the token(s)) of sufficient value (alone or in combination) to support the requested transfer.

In step 404, the service provider creates the transaction (e.g. in the appropriate format for recording on the blockchain, including relevant transaction information such as input token ID(s), target address, transaction amount), and transmits details of the transaction to the counterparty for review, to obtain confirmation from the counterparty, including of the transaction amount. This step can also be extended to enable design of more complex transactions. The counterparty can, for example, be a merchant node or another user that belongs to any service provider. The confirmation request can be sent directly to the target user for the transaction, or to the service provider associated with the target user. Confirmation may be needed, for example, when the underlying blockchain technology requires the transaction to be digitally signed by both participants, in which case the confirmation step involves obtaining signature of the transaction by the target user (or their service provider). However, in some embodiments, the confirmation step may not be needed and may be omitted.

After confirmation is received, the transaction is ready to be submitted by the initial service provider to the relevant network leader (shard controller) for processing. However, to do so, in step 406, the service provider first identifies the appropriate shard (e.g. 378) and the correct network leader (shard controller) for that shard (e.g. 370) according to the UTXO-based sharding methodology.

In preferred embodiment, the shard is identified from the token map 352, which maps token identifiers to shard information. In particular, the token ID for the input token obtained earlier when selecting the token is used to find the corresponding shard (network leader) in the token map. In an embodiment, the token map is a table that records the token ID as the primary key and the corresponding shard identifier (or identifier of the corresponding shard controller/leader) in another column. The table may be implemented as a hash table or hash map, e.g. accessed based on a hash of the token identifier as the key.

Figures 4B, 5:
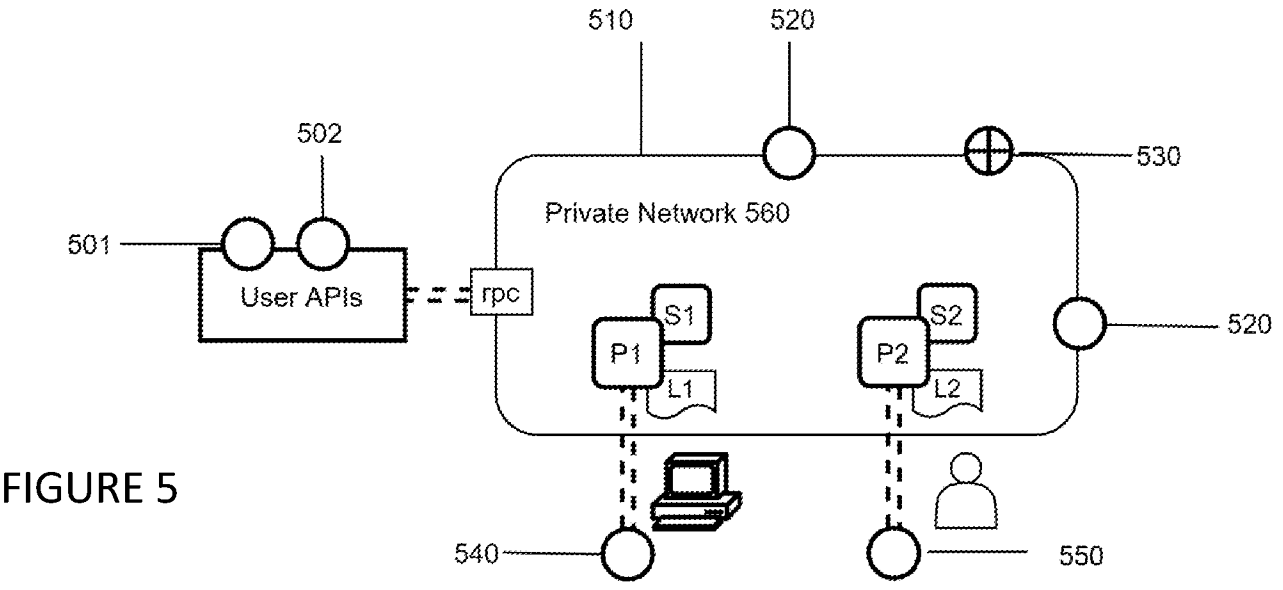
FIG. 4B illustrates an example token map data structure for mapping UTXO tokens to their shard memberships.
FIG. 5 depicts application of the described techniques to a test scenario.

An example of the mapping table is shown in FIG. 4B. In this example the token identifier is in the form of a combination of the transaction identifier of the transaction that created the token and the output index indicating the specific output of that transaction corresponding to the UTXO token, represented by columns "OUTPUT_INDEX" and "TRANSACTION_ID". A "CONSUMED_TIMESTAMP" column specifies when a UTXO token was consumed (being "null" for a token that has not been consumed and is thus a current valid token that can be used in a transaction). The shard and shard controller are identified by the "NOTARY_NAME" column. In this example, the shard blockchains use Corda blockchain technology, in which network leaders are identified as "notaries". Thus, the information in the NOTARY_NAME column directly identifies the network leader (shard controller) for the relevant shard via a notary identifier (e.g. "Notaryl"). In other embodiments, the table could merely identify the shard (e.g. using a shard identifier) and the shard controller/network leader could then be determined separately, e.g. from a separate table mapping shards to their shard controllers/network leaders. A "RECORDED_TIMESTAMP" column specifies the time when the token was added to the token map.

Returning to FIG. 4A, in step 408, the service provider then sends the transaction to the identified network leader 370. To route the transaction to the network leader, the service provider may perform a lookup in a table that maps network leaders/shard controllers to their respective IP addresses or other network addresses.

The service provider identifies the network address from the table and sends the transaction using that address to the network leader for implementing the appropriate consensus requirements. The consensus requirements depend on the blockchain implementation; for example, the network leader may have to obtain consensus from one or more verifying nodes in its private network shard before posting the transaction. Any appropriate consensus algorithm may be utilised. In some embodiments, the network leader may be considered authorised to post transactions directly so that no further consensus steps are needed.

The network leader (shard controller) identifies the input token in its local blockchain in step 409 to confirm the token is valid. For example, the network leader identifies previous records about the token using the token identifier to confirm that the token exists and to verify that it has not previously been spent. It then creates the required transaction and carries out the appropriate consensus algorithm required for addition of the transaction to the local blockchain.

Once the consensus requirements have been fulfilled, the network leader records the transaction locally in step 410 in the blockchain 372 for the local network/shard, at which point the transaction is considered legal.

The network leader then sends a confirmation result to the service provider. As discussed in more detail below, the transaction typically results in one or more new output tokens replacing the input token(s) to the transaction, which are consumed by the transaction. The new tokens may include a token corresponding to the transfer value, assigned to the target user of the transaction, and possibly a change token, assigned to the source user of the transaction, where the total value of the input token(s) exceeded the transfer value. The service provider records these new tokens resulting from the legal transaction in its local database 424 in step 412 (and removes any consumed tokens) and then confirms to the user that the transaction is complete in step 414. Adding new tokens may include adding the tokens to the wallets of the relevant user(s), and updating the token map to map the tokens to the associated shard (which is the same shard where the consumed input token was held). Consumed tokens are removed from (or invalidated in) user wallets and removed from (or invalidated in) the token map. For example, in the FIG. 4B token map data structure, new tokens are added with a “null” value in the “CONSUMED_TIMESTAMP” column, while consumed tokens have their CONSUMED_TIMESTAMP column set the current time (e.g. the commit time of the consuming transaction).

In the present embodiments, tokens are represented and processed based on the UTXO (Unspent Transaction Output) model. Using this approach, each transaction has one or more input tokens and one or more output tokens and the total value of the output tokens equals the total value of the input tokens to the transaction. Input tokens are consumed and replaced by the corresponding (new) output tokens.

A transaction may involve a given token (UTXO) being “transferred” completely to a different user. In this case a single input token (allocated to the source user’s identity) is mapped by the transaction to a single output token (allocated to the target user’s identity). The shard assignment does not change in this case, even if the user is associated with a different service provider, since the sharding is purely token-based, not user-based. In that case, this step may involve notifying another service provider which serves the target user (transaction receiver) about the transaction. The processing of the token proceeds as follows:

| Transaction Input | Transaction Output |
|---|---|
| Token X<br>Transaction ID: 1234<br>Output index: 1<br>Value: 10<br>Owner address: XXXX<br>Shard: ShardA | Token Y<br>Transaction ID: 5678<br>Output index: 0<br>Value: 10<br>Owner address: YYYY<br>Shard: ShardA |

Here, the token is identified by the transaction identifier (ID) of the transaction that produced the UTXO and the output index of the specific output of that transaction that corresponds to the token. Thus, the Transaction ID and output index together form the token identifier. However, in other embodiments, other token representations and token identifiers could be used. Each token is associated with a specific value, along with an owner identifier/address for the owner of the token. Each token is further associated with a shard identifier identifying the shard that controls the token. It will be noted that the output token is assigned to the same shard as the input token. Note in some embodiments, the shard/shard controller for a UTXO token may be recorded as part of the transaction data structure itself in the blockchain, whilst in other embodiments, this information may only be recorded in separate data structures such as the token map data structure (since the shard membership is implicit from the blockchain in which the token is held).

Furthermore, although the above example includes an “owner address” for tokens, this is for illustrative purposes. In reality, the token owner may not be explicitly identified but may be indirectly represented based on cryptographic techniques, as known to those skilled in the art (for example ownership may be tied to a requirement to perform a cryptographic operation, e.g. provide a digital signature, using a specific private key matching a public key used in creating the transaction/token; the holder of the private key is considered the owner of the token who can authorise a transaction spending the token).

In some transactions, where only part of the value of a token is being transferred, a “change” token is produced by the transaction, assigned to the source user identity. This is illustrated in the following example:

| Transaction Input | Transaction Output |
|---|---|
| Token X<br>Transaction ID: 1234<br>Output index: 1<br>Value: 10<br>Owner address: UserA<br>Shard: ShardA | Token Y<br>Transaction ID: 5678<br>Output index: 0<br>Value: 7<br>Owner address: UserB<br>Shard: ShardA<br>Token Z (change token)<br>Transaction ID: 5678<br>Output index: 1<br>Value: 3<br>Owner address: UserA<br>Shard: ShardA |

In this case, both output tokens are allocated to the same shard as the input token. Thus, the same shard remains responsible for all output tokens resulting from a transaction.

The above principles can be extended to other, more complex transaction structures. Additional output tokens may be added to represent transaction fees.

While a single input token is assumed in the above examples, the described approaches can be extended to transactions with multiple input tokens. Where all input tokens are hosted in the same shard, the process in FIG. 4A may be implemented as described using multiple input tokens (whereby the service provider identifies multiple input tokens and sends the token IDs to the network leader 370 of the relevant shard which then records a transaction involving all the specified input tokens). The service provider may preferentially select tokens from the same shard to enable this. If tokens from different shards are to be used in a transaction, this can be accommodated by a cross-shard transaction to merge the tokens as described in more detail later.

Following the described approach, a particular shard remains responsible for a particular “coin” (or a particular unit value of the cryptocurrency), as represented by a series of UTXOs, over the transaction history involving that coin. If the coin owner wishes to consume a coin, they must send a request to the corresponding network shard that is determined by the shard mapping (as given by the output of the sharding hash map with input of the token ID). The shard controller (network leader) for the shard can directly update the coin data in their respective blockchain to transfer the coin to the target user. When the receiver wishes to use (spend) the received coin, they need to send a request to the same network shard according to the UTXO-based sharding hash map. Thus, each shard remains responsible for the coins (tokens) that originated in that shard, over the lifetime of the coins (tokens), regardless of the transfer of ownership of the coins across a series of transactions.

Tokens may originally have been created (“minted”) by the tier-1 network as shown in FIG. 1 and allocated to the respective tier-2 networks (shards). Alternatively, the tier-1 network may delegate authority for creation of tokens to the tier-2 network shards. Once allocated or created in a shard, the token (and its successor tokens) remain under the control of that same shard. As a result, different networks can process transactions in parallel without extra cross-shard communications, resulting in improved overall throughput efficiency across the network.

While this sharding approach is thus designed to reduce or minimize cross-shard transactions, the system may nevertheless support cross-shard transactions in some circumstances, for example to merge tokens across shards.

For example, a user may hold a token of currency value "5" in a first shard, and another token of value "5" in a second shard. The user wishes to make a transfer of 8 currency units. Since the tokens are in separate shards (and hence separate blockchains) they cannot be combined in a single multi-input transaction. As a result, it is necessary to merge these two 5-value tokens together and use the resulting 10-value token for the subsequent 8-value transaction.

An alternative would be to use two 5-value transactions in the different shards to perform the transfer, but this would not be an atomic transaction. For the transaction to be atomic, the 8-value transfer should be performed as one transaction. If the transaction fails, the 8 currency units should be returned to the payer. However, in the parallel transaction approach, if one transaction is successful and the other fails, this could cause various problems, may require implementing transaction roll-back in one of the shards, and/or one shard may be forced to wait indefinitely for another shard to successfully complete its transaction. Furthermore, this approach could ultimately result in excessive fragmentation of tokens, reducing transaction efficiency.

Cross-shard merging transactions involve coordination between two shards to destroy (invalidate) the two source tokens in the respective shards and replace them with a single combined value token in only one of the shards. While in these examples, two tokens are merged, equivalent operations could of course be performed for more than two tokens, from two (or more) shards. A special cross-shard transaction protocol may be implemented to support these types of transactions and ensure they are performed and completed reliably.

A merge transaction may be performed on-demand, i.e. in response to a transaction requiring merging of tokens (e.g. where a user does not have a single token of sufficient value, or combination of tokens in a single shard, to support the requested transaction). Alternatively, token consolidation may be performed offline (that is, not in response to a specific transaction request). For example, shards may periodically perform cross-shard transactions to consolidate users' tokens from different shards, into fewer, larger-valued tokens in a single shard (e.g. a designated "home shard" for a user). Consolidation may alternatively be coordinated by the shards so that the total currency supply in each shard remains substantially unchanged (compared to before consolidation) or remains substantially at a preconfigured total supply value for each shard. Offline consolidation may be performed at quiet times, i.e. times when transaction volumes are lower than at busier times (for example at night) to reduce performance impact on the system's operation.

FIG. 5 illustrates application of the described techniques in an example embodiment, used for experimental evaluation of the system.

In the experimental network 560, the tier-2 network leader 530 decides transaction validity, and the tier-2 network validators 520 work to validate that the leader 530 is not faulty. Apache Jmeter™ is used to simulate public customers 501, 502 and initiate transaction requests to the private network via an RPC (remote procedure call) port. The network then processes transactions and sends them to the leader 530. Two types of merchants were simulated to cover payment scenarios: human-human payment merchants 550 and human-machine payment merchants 540.

Corda was used to build a coin infrastructure. A Corda transaction requires signatures from both the payee and payer. Public customers can connect to any network server and submit transaction requests. Nodes were deployed for the network leader as payer and for each merchant as payees. Experiments were conducted to simulate transaction requests randomly and add time intervals for different merchants to simulate real application conditions.

Human-human payment merchants (HHPM): We use the scenario of a canteen as an example. Canteen staff need to prepare food in a transaction. We measured the interval time of ten continuous payments repeated twenty times, and found this took 18.7 s for every transaction on average.

Human-machine payment merchants (HMPM): We use the scenario of a vending machine as an example. Human-machine payments are more efficient than human-human payments. We measured the interval time of ten continuous payments repeated twenty times, and found this took 11.3 s for every transaction on average.

In every experiment, the following steps were implemented:

- The tier-1 network leader issues a 1000-dollar stablecoin to every customer in the tier-2 network.
- The tier-1 network leader distributes different stablecoins equally to every tier-2 network leader. This can distribute transaction requests to tier-2 network servers in balance.
- We randomly select wallets to start transactions with random merchants.
- We measure related performance metric data.

Figure 6:
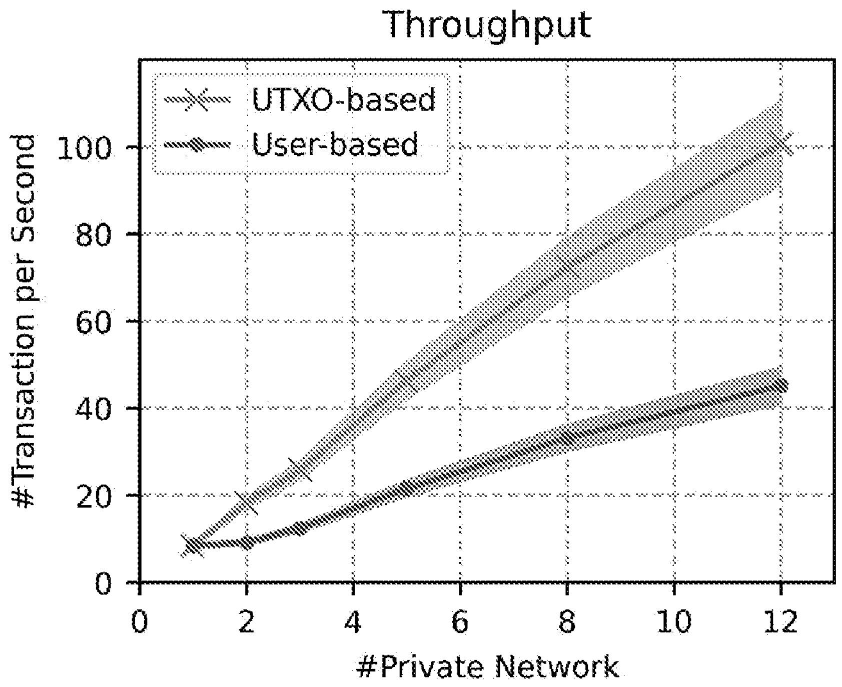
FIGS. 6 and 7 illustrate experimental results for transaction throughput and latency in the test scenario.
Figure 7:
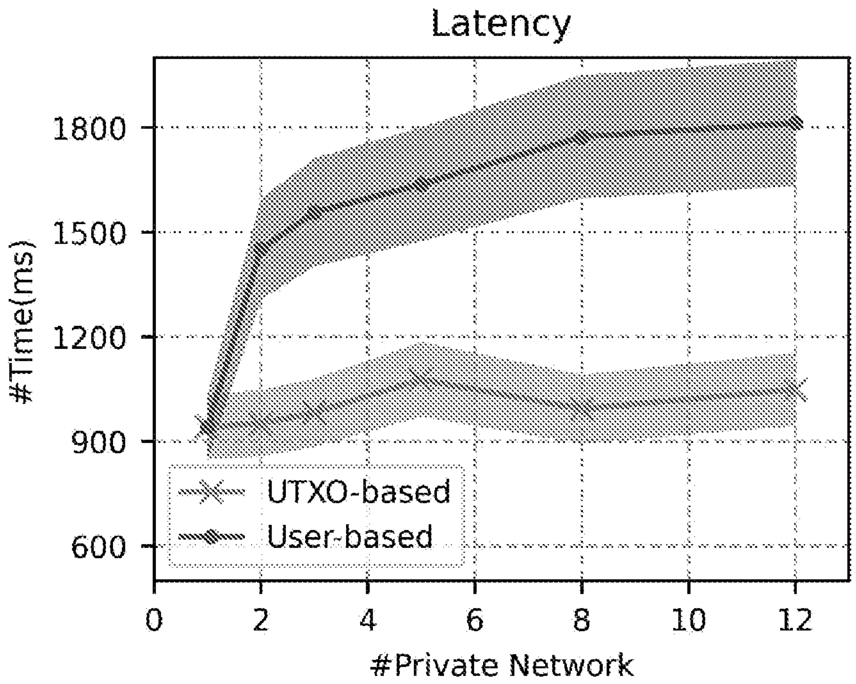

FIGS. 6 and 7 show experimental results. FIG. 6 shows transaction throughput in transactions per second for different numbers of private networks (shards), for implementations based on user-based sharding and based on UTXO-based sharding. FIG. 7 shows transaction latency (in ms) for different numbers of private networks (shards), again for both user-based and UTXO-based sharding. The results illustrate that, for UTXO-based sharding, transaction throughput increases approximately linearly with increases in the number of shards, at a much lower rate than in the user-based sharding approach, and without a corresponding increase in latency. It can be seen that, while there are some changes in latency for UTXO-based sharding, there is no substantial increase as the number of shards increases, unlike in the user-based sharding case.

Figure 8:
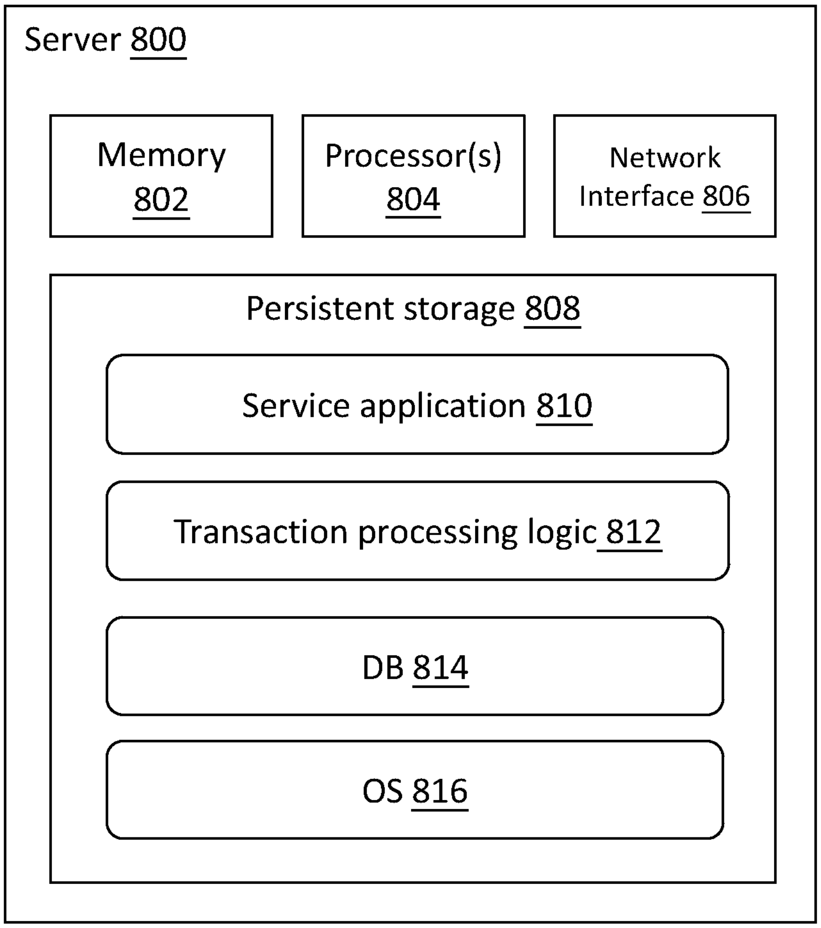
FIG. 8 illustrates a processing device for implementing certain aspects of the described techniques.

FIG. 8 illustrates an example of a processing device 800, such as a server, that may be used to implement the described techniques. The processing device may operate as a service provider node 350 (FIG. 3B).

The server 800 includes one or more processors 804 together with volatile/random access memory 802 for storing temporary data and software code being executed. A network interface 806 is provided for communication with other system components, such as user devices and shard controllers, over one or more networks (e.g. Local and/or Wide Area Networks, including the Internet).

Persistent storage 808 (e.g. in the form of hard disk storage, solid state storage and the like) persistently stores software and data for performing the described functions of the service provider. This includes a service application 810 for providing cryptocurrency services to users (e.g. by interacting with client devices), transaction processing logic 812 for executing transactions requested by users according to the FIG. 4A process, including identifying and communicating with relevant shard controllers as described previously, and a suitable server operating system 816. Persistent storage may further include a database 814 for storing data used by the service provider (for example user information, wallet data, and the token map 352 of FIG. 3, as illustrated by way of example in FIG. 4B).

The processing device will include other conventional hardware components as known to those skilled in the art, and the components are interconnected by one or more data buses (e.g. a memory bus and I/O bus).

While a specific architecture is shown and described by way of example, any appropriate hardware/software architecture may be employed to implement the system.

Furthermore, functional components indicated as separate may be combined and vice versa. For example, the database 814 may be provided in a separate database server instead of being integrated into server 800. More generally, the functions of server 800 may be distributed over multiple processing devices.

The shard controllers may be implemented using similar general-purpose processing devices as depicted in FIG. 8, e.g. using standard server hardware/software, running blockchain software to configure the shard controllers as nodes of their respective blockchains, and transaction logic for executing the shard controller's part of the FIG. 4A process.

It will be understood that the present invention has been described above purely by way of example, and modification of detail can be made within the scope of the invention.

While described in relation to Corda-based cryptocurrencies, the described techniques can also be applied to other regulated or unregulated cryptocurrency and digital asset systems, such as central bank digital currency. More generally, the described techniques can be used to improve transaction performance in any token transaction network, regardless of the types of assets, entities or concepts that are represented by the tokens.

Furthermore, while UTXO-based sharding techniques have been described, the techniques can be used with other types of tokens. Such approaches may be described more generally as token-based sharding. As already described, in such approaches different tokens (whether UTXO or other types) are hosted (and transactions processed) in different subnetworks/blockchains, based on token identity (e.g. as given by a token identifier for a token).

The invention claimed is:

1. A method of performing a blockchain transaction in a transaction network comprising a plurality of transaction network shards, each shard maintaining a respective blockchain for recording blockchain transactions, the method comprising:

receiving a transaction request for transferring asset value represented by one or more tokens;

determining an input token for use in the transaction;

identifying, from the plurality of shards, an identified shard associated with the input token, the identified shard being identified by looking up shard information for the input token in a token map data structure, the token map data structure mapping, for each of a plurality of tokens, token identifying information to shard information that identifies the shard hosting the token;

forwarding transaction information for the transaction to a shard controller associated with the identified shard to initiate performance of the transaction by the shard controller, the shard controller recording the transaction in a blockchain associated with the identified shard, wherein the transaction consumes the input token; and generating one or more output tokens, the one or more output tokens associated with the same identified shard as the input token.

2. The method of claim 1, wherein the identifying step comprises accessing a data structure providing a mapping between tokens and the shards hosting the tokens.

3. The method of claim 2, wherein the data structure comprises a table, optionally a hash map.

4. The method of claim 1, wherein the token map data structure identifies for each token, a corresponding shard identifier of the shard hosting the token and/or an identifier of a shard controller for that shard.

5. The method of claim 1, wherein token identifying information for a given token comprises a transaction identifier of a transaction that generated the token and optionally further comprises an output index identifying a particular output of that transaction.

6. The method of claim 1, wherein tokens comprise Unspent Transaction Outputs (UTXO).

7. The method of claim 1, performed at a service provider processing device.

8. The method of claim 1, wherein the shard controller associated with the identified shard is a given one of a plurality of shard controllers associated with respective ones of the shards which is configured for controlling and/or recording transactions involving the input token.

9. The method of claim 1, wherein each shard is arranged to maintain a respective blockchain for recording transactions, and wherein each blockchain is optionally a permissioned blockchain.

10. The method of claim 1, wherein each shard comprises a subnetwork of the transaction network, optionally comprising a private network.

11. The method of claim 10, wherein each shard comprises one or more network nodes of a blockchain network for the blockchain maintained by the shard, the network nodes including the shard controller for the shard.

12. The method of claim 1, wherein the transaction network is arranged for processing transactions involving a plurality of tokens, and wherein each network shard and blockchain is arranged to process and/or record transactions for a respective subset of the plurality of tokens.

13. The method of claim 12, wherein each token is stored in a respective one of the blockchains and/or associated with a particular one of the plurality of shards.

14. The method of claim 1, further comprising initiating, by the shard controller, a consensus process involving one or more other nodes of its shard prior to recording the transaction.

15. The method of claim 1, further comprising updating the token map data structure to include entries identifying the one or more output tokens and the identified shard in which the one or more output tokens are hosted.

16. The method of claim 1, wherein determining the input token comprises selecting one of a plurality of tokens associated with a user submitting the transaction request based on a transaction value of the transaction.

17. A transaction system comprising:

a plurality of shards, each shard comprising:

a blockchain network adapted to maintain a set of transactions for the shard in a blockchain; and a shard controller controlling recording of transactions in the blockchain of the shard;

wherein each shard manages a respective set of tokens stored in the respective blockchain of the shard, the shard controller for a shard controlling transaction processing for tokens managed by the shard;

a service provider node performing transactions for transfer of assets represented by tokens, the service provider node operable to:

receive a request to process a transaction involving a token;

identify one of the shards hosting the token by looking up shard information for the token in a token map data structure, the token map data structure mapping, for each of a plurality of tokens, token identifying information to shard information that identifies the shard hosting the token, wherein the token is stored in the blockchain of the identified shard; and transmit transaction information for the transaction to the shard controller of the identified shard;

wherein the shard controller records a transaction relating to the token in its blockchain based, at least in part, on the transaction information, wherein the transaction consumes the token and generates one or more output tokens, the one or more output tokens associated with the same shard as the token.

18. The transaction system of claim 17, wherein the service provider node is further configured to update the token map data structure to include entries identifying the one or more output tokens and the shard in which the one or more output tokens are hosted.

19. The transaction system of claim 17, wherein the service provider node is further configured to remove or invalidate the token from the token map data structure after the transaction consumes the token.

20. A non-transitory computer readable medium storing computer interpretable instructions, which when executed by a processor, cause the processor to perform operations, comprising:

receiving a transaction request for transferring asset value represented by one or more tokens;

determining an input token for use in the transaction;

identifying, from a plurality of transaction network shards, an identified shard associated with the input token, the identified shard being identified by looking up shard information for the input token in a token map data structure, the token map data structure mapping, for each of a plurality of tokens, token identifying information to shard information that identifies the shard hosting the token;

forwarding transaction information for the transaction to a shard controller associated with the identified shard to initiate performance of the transaction by the shard controller, the shard controller recording the transaction in a blockchain associated with the identified shard, wherein the transaction consumes the input token; and generating one or more output tokens, the one or more output tokens associated with the same identified shard as the input token.

* * * * *